United States Patent [19]
Burger et al.

[11] Patent Number: 5,296,768
[45] Date of Patent: Mar. 22, 1994

[54] REVOLUTIONS PER MINUTE REGULATION DEVICE FOR A HAND-HELD ELECTRIC TOOL AND METHOD OF ITS MANUFACTURE

[75] Inventors: Helmut Burger, Weilheim; Wolfgang Millauer, München, both of Fed. Rep. of Germany

[73] Assignee: Hilti Aktiengesellschaft, Liechtenstein

[21] Appl. No.: 966,765

[22] Filed: Oct. 26, 1992

[30] Foreign Application Priority Data

Nov. 14, 1991 [DE] Fed. Rep. of Germany ....... 4137385

[51] Int. Cl.⁵ ........................................... H02K 11/00
[52] U.S. Cl. ................................... 310/68 B; 310/50; 318/257
[58] Field of Search ............... 310/43, 47, 50, DIG. 3, 310/68 B; 318/17, 66, 68, 257; 173/47, 48, 90

[56] References Cited

U.S. PATENT DOCUMENTS

| | | | |
|---|---|---|---|
| 3,828,863 | 8/1974 | Bleicher et al. | 173/48 |
| 4,412,158 | 10/1983 | Jefferson et al. | 318/257 |
| 4,820,962 | 4/1989 | Millauer | 318/602 |
| 4,852,434 | 8/1989 | Bald | 82/118 |
| 4,952,830 | 8/1990 | Shirakawa | 310/68 B |

FOREIGN PATENT DOCUMENTS 2568377 7/1984 France ................. 310/68 B

OTHER PUBLICATIONS

Prospectus Kress Elektrowerkzeuge, 1992 pp. 2, 3 and 13.

Primary Examiner—Steven L. Stephan
Assistant Examiner—Matthew Nguyen
Attorney, Agent, or Firm—Anderson Kill Olick & Oshinsky

[57] ABSTRACT

A revolutions per minute (RPM) control device for hand-held electric tools, such as drilling tools and hammer drills, has a RPM sensor in a separate housing or container from the control device housing. The sensor is connected to the control device by a flexible cable. The sensor extends through an opening in the drive motor housing of the electric tool. The RPM control device can be used for a plurality of similar types of tools.

4 Claims, 4 Drawing Sheets

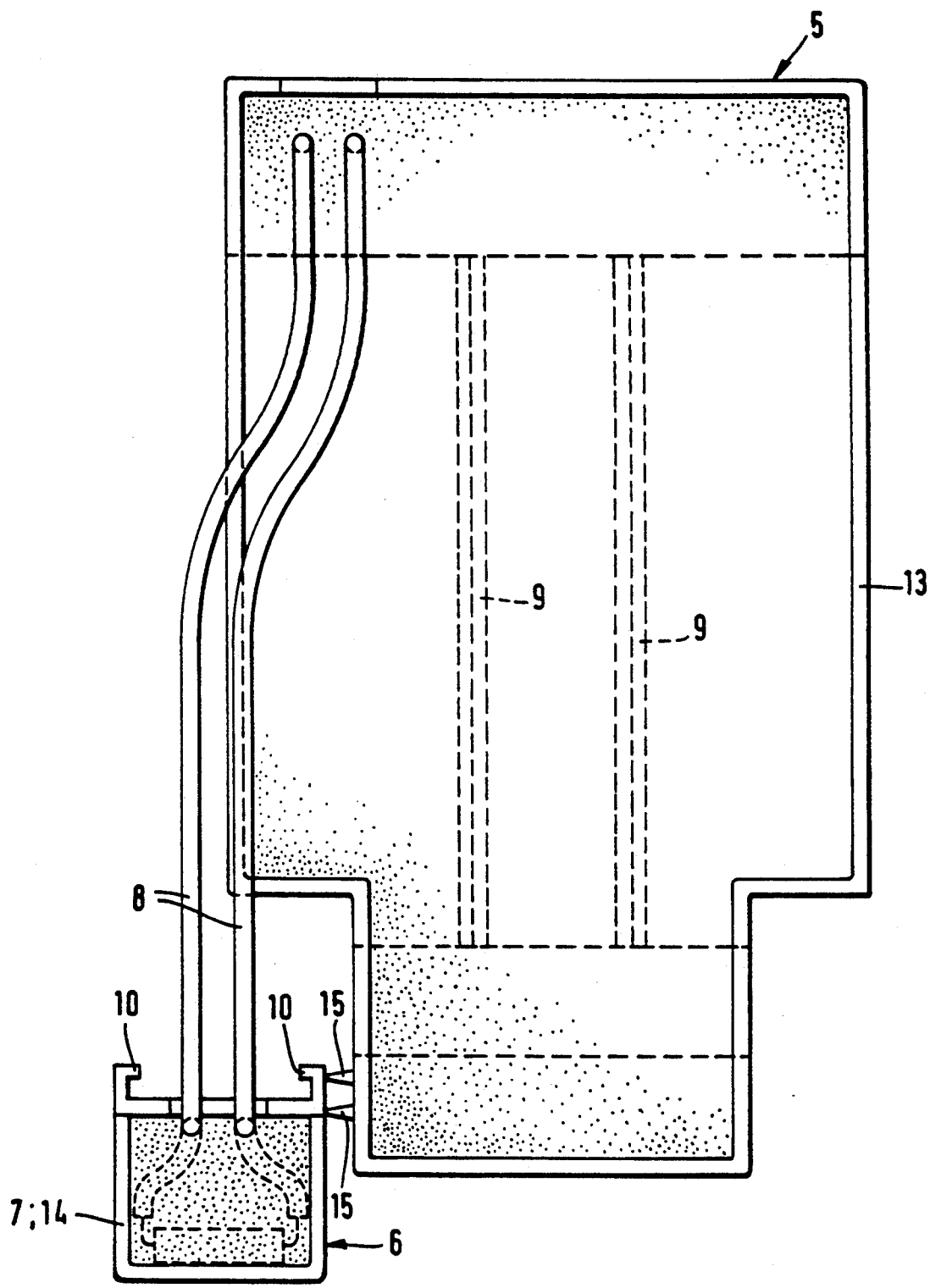

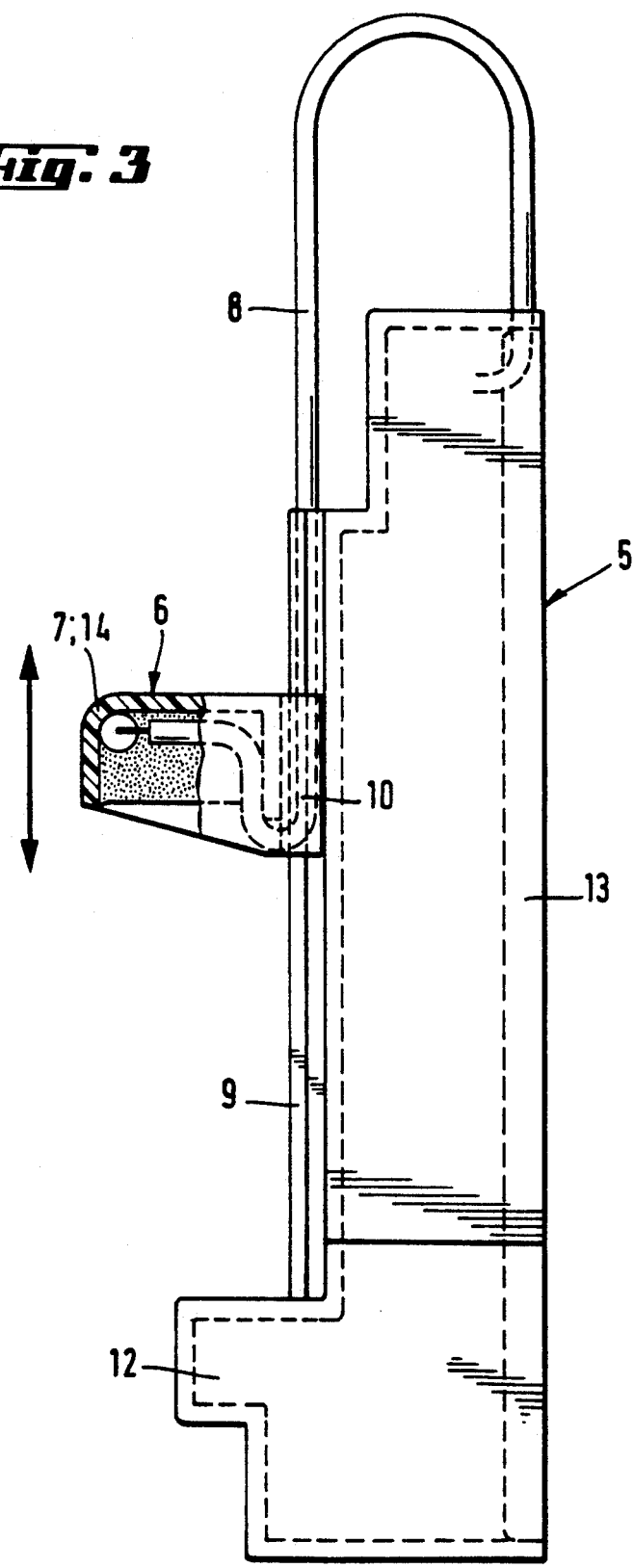

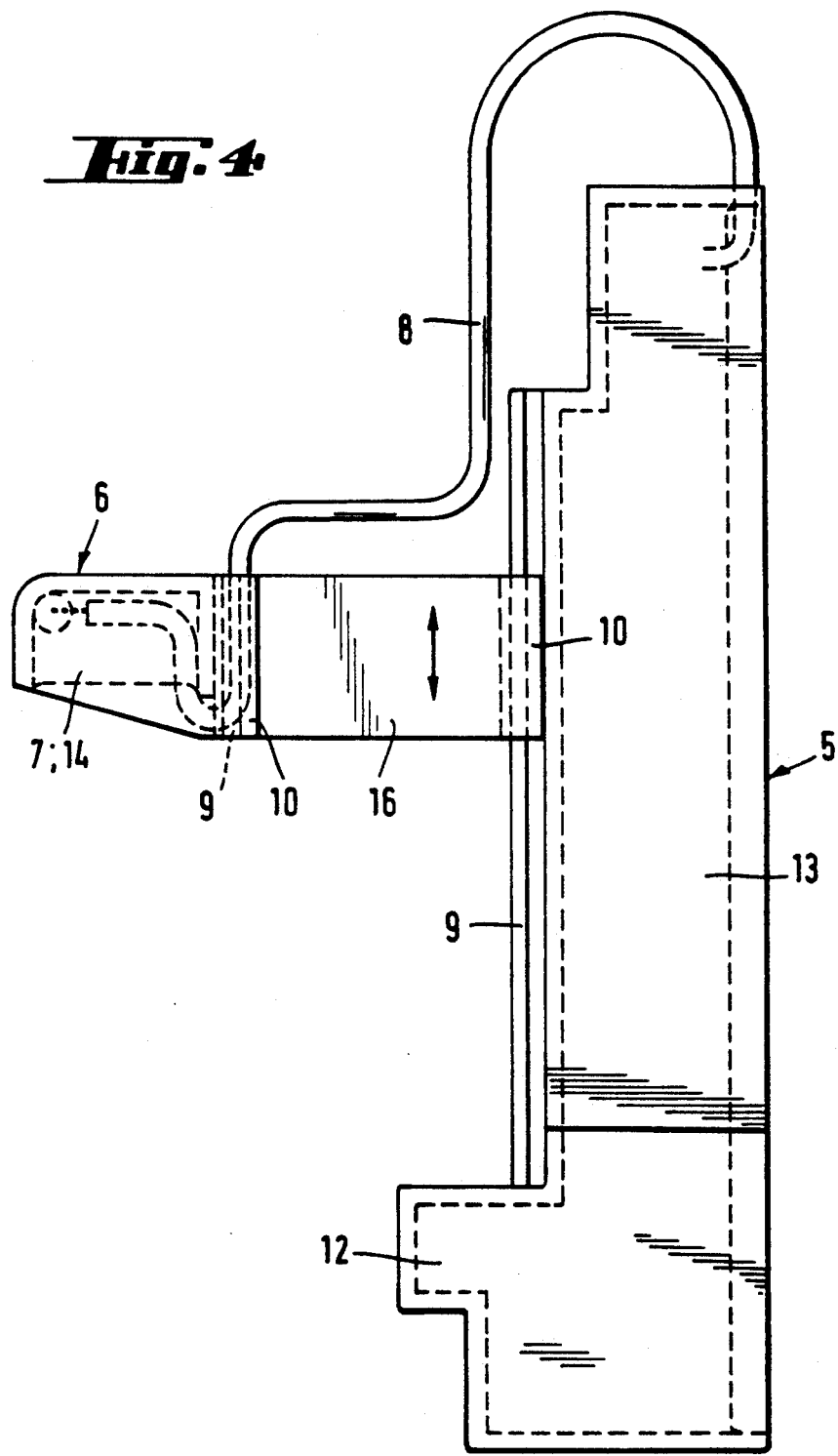

REVOLUTIONS PER MINUTE REGULATION DEVICE FOR A HAND-HELD ELECTRIC TOOL AND METHOD OF ITS MANUFACTURE

BACKGROUND OF THE INVENTION

The present invention is directed to a revolutions per minute (RPM) regulation device for a hand-held electric tool with the device insertable as a separate block-like unit or module into a space between the tool handle and drive motor housing of the tool. The control device includes an RPM sensor for registering the RPM of an electric motor located in the drive motor housing. Further, the invention is directed to a method of manufacturing the encapsulated electronic components of the control device for hand-held electric tools of different types.

It is advantageous and known in electric tools of the above type, for instance, hammer drills and drilling tools, as well as hand-held grinding and cutting tools, to provide an electronic RPM control device for the drive motor inserted as a unit into a space between the handle and the drive motor housing. This space located in the region between the handle and the drive package is advantageous, because with regard to the required connections, it is located on the shortest path between the handle, where the electric energy is usually supplied by a cable and controlled by a switch, and the drive motor where the electric energy is used. Moreover, in the region adjacent the motor it is possible to install the RPM sensor required for RPM control (tachogenerator) directly at the RPM control circuit usually provided as a separate block-like encapsulated electronic component with the advantage of short and less malfunction-prone connections. In addition, in this arrangement, the RPM sensor can extend through a housing opening into the region of the drive motor for approaching, as closely as possible, to a rotating part whose RPM is to be registered. Accordingly, nearly all possible tachometer principles can be utilized, possibly the combination of a rotating magnetic ring, whose magnetic field flux changes are acquired or registered by induction coils along with a Hall sensor. It is also possible to use light barrier systems, for instance, known as a so-called fork-like barrier with a perforated disc.

Problems with the known RPM control device of the mentioned type result, however, that for different hand-held electric tools and for different sizes of identical electric tools, an individually adapted and manufactured RPM control device must be formed as a block-like unit or module and must always be available from storage.

SUMMARY OF THE INVENTION

Therefore, the primary object of the present invention is to provide an improved RPM control device for electric tools of the above-mentioned type, so that it can be utilized in a plurality of similar types of tools in as identical a construction as possible.

Accordingly, the present invention uses the concept that the RPM control device can be the same for a plurality of similar types of tools as far as the electronic circuits are concerned, and also as an encapsulated component, provided that the RPM sensor used in each case is adaptable to the size and shape of the respective electric tool as well as to its position at or in the tool.

As a result, in the present invention a RPM control device of the type mentioned above has the RPM sensor positioned in a separate housing with the sensor extending through an accurately fitted centered opening into the drive motor housing of the electric tool and with the sensor connected by a flexible cable to the components of the RPM control device. The separate housing of the RPM sensor can be mounted in a sliding guide on the housing of the RPM control device.

To afford an advantageous and economic manufacture of the encapsulated electronic component of a RPM control device with a RPM sensor for hand-held electric drilling tools of different types, the invention provides a follows:

A block-like plastics material container forming a protective sheath for the electronic components of the RPM control device fabricated in an injection molding process with a second plastics material container attached by a connecting web, which is severable during subsequent assembly, with the second container intended as a protective sheath for the RPM sensor and produced as a single unit with the first container in the injection molding process.

After the injection molding of the containers, the components of the RPM control device are placed in the first container and the components of the RPM sensor are placed in the second container, with the RPM sensor connected by a flexible cable to the RPM control device.

Subsequently, the two plastics material containers are filled with a compound for encapsulating the components therein.

In the course of proper installation of the control device into the electric tool, the second plastics material container holding the RPM sensor is detached from the first container by severing the connecting web or webs and is then inserted into an accurately fitted, centered opening in the drive motor housing of the electric tool, whereby it is aligned contact-free with a rotating part of the drive motor, for instance, a magnetic ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING IN THE DRAWING

FIG. 2 is an elevational view of the RPM control device as initially manufactured;

FIG. 3 is an elevational view of the RPM control device unit with the RPM sensor slidably displaceable on the control device housing with the sensor shown in more detail; and FIG. 4 is an elevational view of an RPM control device unit similar to FIG. 3, however, with a variable extension of the RPM sensor relative to the control device.

DETAILED DESCRIPTION OF THE PREFERRED EMBODIMENTS

Figure 1:
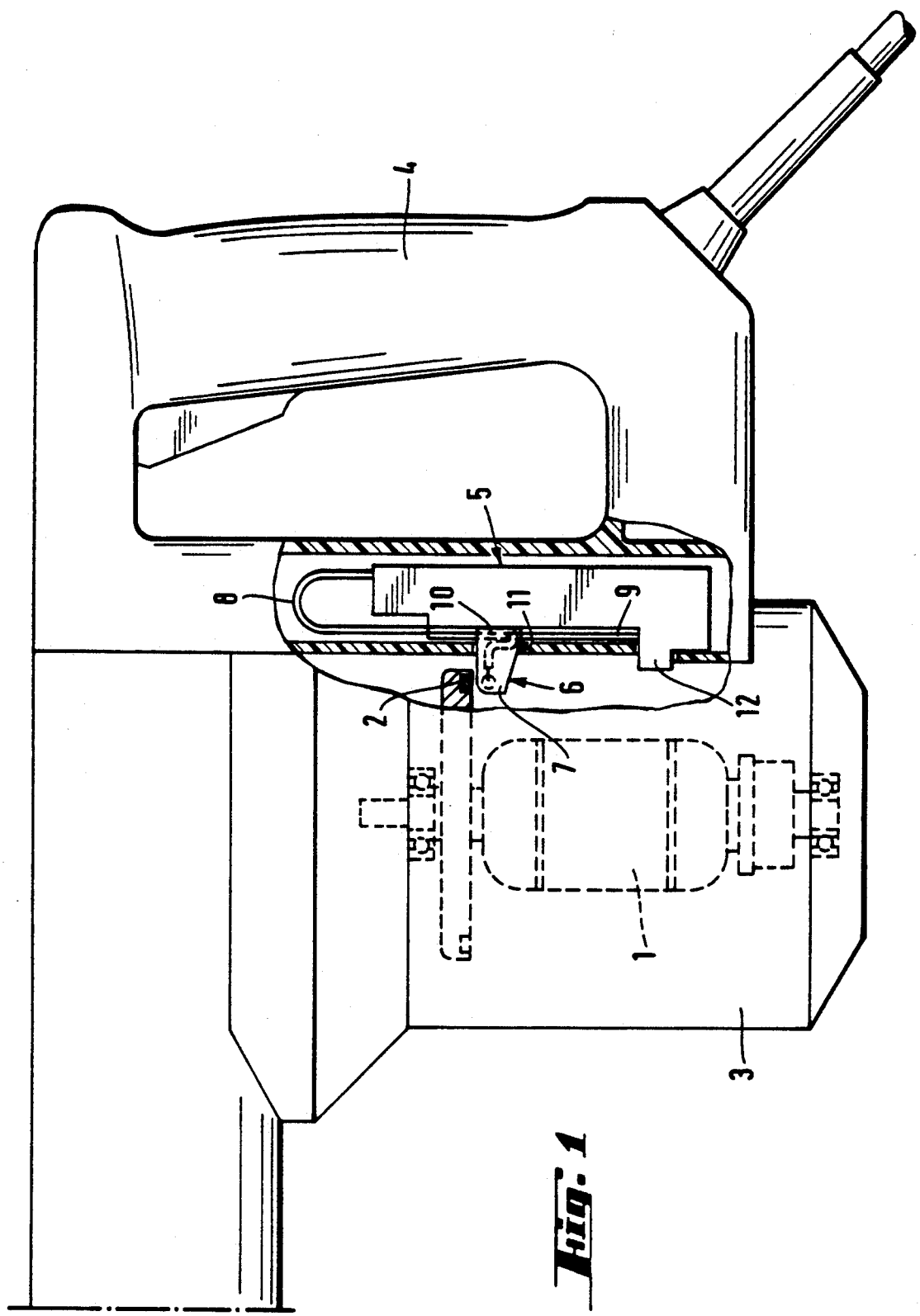
FIG. 1 is a side view of the rear part of a hammer drill with a RPM control device unit embodying the present invention and shown schematically.

In the partial illustration in FIG. 1, a hammer drill is shown with an electric motor 1 located in a housing 3.

The motor has a rotor axis connected to a rotating magnetic ring 2 either directly or through an intermediate linkage. The field of the magnetic ring 2, changing during rotation, is registered by a tachogenerator or an RPM sensor 6 including in a known manner, in a region aligned with the magnetic ring 2, an induction coil or a Hall sensor. The RPM sensor is located in a housing 7 extending through an opening 11 into the interior of the motor housing 3. Housing 7 with the RPM sensor 6 encapsulated within it, has slide guide elements 10 on the exterior of the housing 3, note FIG. 2, cooperating with slide rails 9 on the block-like housing 13 of an RPM control device fabricated as a compound filled electronic components block-like unit. As a result, the RPM sensor 6 along with the housing 7 can be moved in the vertical direction as shown in FIG. 1 and can be adapted to different openings in drive motor housings 3 of different sizes. By means of the opening in the drive motor housing 3, the RPM sensor is fixed in an accurate and positionally correct manner oriented relative to the magnetic ring 2. The RPM sensor 6 is connected with the compound filled block-like unit of the RPM control device 5 by a flexible cable 8 with the control device accurately fitted into a recess in the handle 4 of the electric tool and it is fixed in position in the tool housing 3 by a retaining lug 12.

FIG. 2 displays the manufacturing method of an RPM control device block-like unit of the type embodying the invention. In FIG. 2 a first block-like plastics material container 13 is shown in an elevational view arranged for receiving the electronic parts and components of the RPM control device 5. The first plastics material container 13 is connected with a second smaller plastics material container 14 by one or a plurality of severable webs 15 with the containers formed as a single piece. The second container 14 is also considered as an auxiliary container. Slide guides 10 are molded on the exterior of the second container 14. The larger first plastics material container 13 and the auxiliary or second plastics material container 14 are manufactured in a single method step as a monolithic plastics material molded part. While the two containers 13, 14 are still connected together by the connecting webs 15, the electronic components of the RPM control device are inserted into the first container 13 and the RPM sensor is placed in the second container 14 and then the sensor is electrically connected with the RPM control device 5 by a flexible cable 8. Subsequently, a compound is filled into the two containers in a known manner, so that when the filling step is completed the RPM control device 5 and the RPM sensor 6 are still connected as a single unit so that easy handling and storage is possible.

For installation into the electric tool, initially the web or webs 15 are severed, so that the RPM sensor 6 and its housing 7 formed by the second or auxiliary container 14 is independent of the block-unit of the RPM control device within the range afforded by the length of the cable 8, whereby a simple adaptation to different structural sizes of the drive motor housing of the electric tool is possible. The RPM sensor 6 can be adapted to different installation positions by displacing the guides 10 in the slide guide rails 9.

FIG. 3 shows the combination of the RPM control device 5 and RPM sensor 6 in more detail affording a better showing of the guide rails 9 than in FIG. 1.

FIG. 4 shows another preferred embodiment of the invention. In this embodiment the housing 7 of the RPM sensor 6 is attached to the guide rails 9 by a replaceable adaptor piece 16 affording an additional set of guide rails 9 and guides 10. As a result, the extension of the sensor 6 is adapted to different conditions of the drive motor housing of the electric tool. The adaptor part 16, as a rule, can be manufactured economically as a plastics material part of variable dimensions.

In accordance with the present invention, it is possible to utilize the electronic RPM control device unit for hand-held electrical working tools with a large number of variable RPM sensors or tachometer systems, without changing the overall control device unit and losing its universal characteristic.

While the invention has been illustrated and described as embodied in a method and apparatus for revolutions per minute regulation device for a hand-held electric tool and method of its manufacture, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

The compound material can be an epoxy resin, silicone resin or polyurethan resin.

We claim:

1. Revolutions per minute (RPM) control device for a hand-held electric tool insertable as a separate block-like unit (5) into a space in the region of a handle (4) and a drive motor housing (3) of the electric tool comprising a RPM sensor for checking the RPM of an electric motor in the drive motor housing of the electric tool by a rotating excitation device (2) driven by said electric motor which RPM sensor (6) is connected with the separate blocklike unit (5) of said control device via an elongated flexible cable (8), wherein the improvement comprises a separate housing (7, 14) for the RPM sensor (6) arranged to fit into and through an opening through a wall of the driving motor housing (3) which opening is arranged in alignment to said excitation device (3), and said separate housing (7, 14) of the RPM sensor (6) is provided with guides (10) slidably displaceably held in elongated slide guides (9) in said block-like unit of the RPM control device such as to be adjustable in the elongated direction of said slide guides (9) during assembly of said tool to the position of said wall opening in the drive motor housing, a flexible cable connecting said separate housing and said block-like unit.

2. Revolutions per minute control device, as set forth in claim 1, including means for varying an extension of the RPM sensor transversely of the slide guides.

3. Revolutions per minute control device, as set forth in claim 3, wherein said means comprises an adaptor piece extending transversely of the slide direction and engageable in said slide guides of said RPM control device and said guides of said RPM sensor.

4. Revolutions per minute control device, as set forth in claim 1, wherein said electric tool is one of a drilling tool and a hammer drill.

* * * * *